(12) United States Patent
Grob et al.

(10) Patent No.: US 6,360,100 B1
(45) Date of Patent: Mar. 19, 2002

(54) METHOD FOR ROBUST HANDOFF IN WIRELESS COMMUNICATION SYSTEM

(75) Inventors: Matthew S. Grob, La Jolla; Roberto Padovani, San Diego; Paul E. Bender, San Diego; Gadi Karmi, San Diego; Robert H. Kimball, San Diego; Greg M. Hoagland, San Diego, all of CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/158,665

(22) Filed: Sep. 22, 1998

(51) Int. Cl.[7] ................................................. H04Q 7/20
(52) U.S. Cl. ...................... 455/442; 455/437; 455/450; 370/332
(58) Field of Search ................................. 455/436, 437, 455/442, 439, 443, 67.1, 450; 370/331, 335, 332, 491

(56) References Cited

U.S. PATENT DOCUMENTS 5,267,261 A    11/1993  Blakeney, III et al.
6,055,428 A  *  4/2000  Soliman ..................... 455/442
6,073,021 A  *  6/2000  Kumar et al. ............... 455/442

OTHER PUBLICATIONS

Pollini, Gregory P. "Trends in Handover Design" IEEE Communications Magazine 34(3): 82–90 (Mar. 1996).

* cited by examiner

Primary Examiner—Lester G. Kincaid
(74) Attorney, Agent, or Firm—Philip Wadsworth; Kent D. Baker; Pavel Kalousek

(57) ABSTRACT

A communication system that allows a soft handoff to be completed, even when the communications link between the active base station and the mobile station deteriorates before the mobile station has received the handoff direction message. The mobile station maintains a list of base stations that the mobile station is in communication with, referred to as an "Active Set". In addition, the mobile station maintains another list of base stations that are proximate to the base stations in the active set. This list is referred to as the "Neighbor Set". A memory within the mobile station includes information that would allow the mobile station to demodulate information transmitted from those base stations on the neighbor set. In accordance with the disclosed method and apparatus, the mobile station places a base station in the active set upon including the base station in a pilot strength measurement message (PSMM). The mobile station monitors transmissions from all of the base stations on the active set to receive a handoff direction message (HDM).

20 Claims, 7 Drawing Sheets

METHOD FOR ROBUST HANDOFF IN WIRELESS COMMUNICATION SYSTEM

BACKGROUND

1. Field of the Invention

The present invention relates to the field of telecommunications, and more particularly to an improved method and system for handing off communications between cells or sectors of a wireless communication system.

2. Description of the Related Art

Wireless cellular communications is becoming a convention method for people to communicate with one another. A conventional wireless cellular communication system in accordance with an industry standard commonly known as IS-95B, which is issued by the Telecommunications Industry Association and Electronics Industry Association (TIA/EIA) defines the way in which one type of wireless cellular communications is performed. In accordance with IS-95B, a mobile station (such as a wireless cellular mobile telephone) communicates with other mobile stations, a conventional telephone, or other such communication devices over a communications link that includes at least one cellular base station. The mobile station transmits a radio signal to the cellular base station. The cellular base station establishes a connection to a wired network that might include conventional telephone circuits (commonly known as the public switched telephone network (PSIN)).

A mobile station need only establish communication through one base station at a time in order to communicate with a device at the other end of the communications link (i.e., make a "call"). However, as a mobile station moves, the mobile station and the base station may lose the ability to communicate over the radio link. For example, if the mobile station moves outside the range of the base station or if an obstruction comes between the mobile station and the base station, the communications between the mobile and base stations will be interrupted. Therefore, the placement of base stations is planned such that there is an overlap between the coverage areas of each base station. This overlap ensures that a mobile station can contact at least one base station in every geographic point intended to be covered by the system. This is important because if the mobile loses contact with all bases stations for any substantial amount of time, the call is "dropped". Once a call is dropped, the call must be reestablished by the mobile station redialing the call.

Due to the substantial overlap between base station coverage areas, a procedure known as "soft handoff" can be performed. Soft handoff is a process in which the mobile station receives identical signals from both a first and a second base station. A mobile station will preferably enter soft handoff (i.e., signals from a second base station will be received by the mobile station) whenever a second station becomes available. Soft handoff ensures that a call is not dropped as the mobile station moves out of the coverage area of a first base station and into the coverage area of a second base station.

One conventional method for performing a soft handoff is illustrated in FIG. 1. FIG. 1 shows a mobile station 101, a first base station 103, a second base station 105, and a mobile switching center (MSC) 107. In addition, the time sequence of communications between each is illustrated as follows. Arrowheads that terminate on the vertical line 109 that descends from the mobile station 101, for example, represent signals received by the mobile station 101. Arrows that terminate without an arrow head (i.e., at originate) at the vertical line 109 represent signals that have been transmitted from the mobile station 101. Arrows that are closer to the top of the figure represent signals that are transmitted before signals represented by arrows closer to the bottom of the figure. In some instances, an arrow that is above another arrow may represent a signal that is transmitted continuously and thus may be transmitted concurrent with the signal represented by the lower arrow. For example, the traffic signal represented by arrow 111 may continue to be transmitted concurrent with the pilot strength measurement message (PSMM) that is represented by arrow 113.

As shown in FIG. 1, the traffic signal 111 is initially transmitted between the mobile station 101 and the base station 103. The traffic that is transmitted from the mobile station 101 to the base station 103 is then sent on to the MSC 107 by the base station 103. Likewise, traffic that originates at the MSC 107 is sent to the base station 103. This traffic is then transmitted from the base station 103 to the mobile station 101. When the mobile station 101 detects a pilot from the second base station 105 with sufficient power, the mobile station 101 transmits a PSMM to the first base station 103 indicating the pilot strength of all the pilots that are currently being received at a signal level that is above a predetermined threshold. In the case shown in FIG. 1, the PSMM indicates that the mobile station 101 is receiving pilot signals that are above the predetermined threshold from both the first base station 103 and the second base station 105. This PSMM is then transmitted from the first base station 103 to the MSC 107, as represented by arrow 115. The MSC 107 responds to the receipt of this PSMM by requesting the second base station 105 to allocate resources to establishing a communication link between the second base station 105 and the mobile station 101, as represented by the block 116. In addition, the MSC 107 generates a handoff direction message (HDM). The HDM is transmitted from MSC 107 to the first base station 103, represented by the arrow 117, after a time delay, represented by the arrow 119. The HDM message is then transmitted from the first base station 103 to the mobile station 101, represented by the arrow 121. The HDM indicates to the mobile station 101 that a request has been made for the second base station 105 to allocate resources to establishing a communications path between the second base station 105 and the mobile station 101.

The mobile station 101 responds to the HDM by adding the second base station 105 to the "Active Set" in the mobile station 101 and transmitting a handoff completion message (HCM) to both the first base station 103 and the second base station 105, represented by the arrows 123, 125. Both the first and second base stations 103, 105 transmit the HCM to the MSC 107, represented by the arrows 127, 129. The active set in the mobile station 101 indicates which base stations are actively in communication with the mobile station 101. Traffic will then be transmitted from the MSC 107 to the mobile station 101 through both the first and second base stations 103, 105.

This procedure works well in most cases. However, in some cases, the pilot transmitted from the second base station 105 is received by the mobile station shortly before the signals received from the first base station 103 can no longer be received by the mobile station 101. If the time delay between receipt of the PSMM 115 and the transmission of the HDM from the first base station 103 is such that the communication link between the mobile station 101 and the first base station 103 deteriorates before the HDM can be received from the first base station 103 by the mobile station 101, then the call will drop.

SUMMARY OF THE INVENTION

The disclosed method and apparatus allows a soft handoff to be completed, even when the communications link between the active base station and the mobile station deteriorates before the mobile station has received the handoff direction message. The mobile station maintains a list of base stations that the mobile station is in communication with, referred to as an "Active Set". In addition, the mobile station maintains another list of base stations that are proximate to the base stations in the active set. This list is referred to as the "Neighbor Set". A memory within the mobile station includes information that would allow the mobile station to demodulate information transmitted from those base stations on the neighbor set. In accordance with the disclosed method and apparatus, the mobile station places a base station in the active set upon including the base station in a pilot strength measurement message (PSMM). Alternatively, the mobile station places a base station in the active set upon detecting that the signals transmitted from that base station are being received at a signal strength that is greater than a predetermined threshold.

The mobile station will monitor transmissions from all of the base stations on the active set. When a PSMM transmitted from the mobile station is received by the base station, the base station will transmit the PSMM to the mobile switching center (MSC). The MSC then requests each of the base stations indicated in the PSMM to allocate resources to the mobile station and to send a handoff direction message (HDM). Accordingly, even if the communication with the base station through which the mobile is currently receiving traffic fails before that base station has successfully transmitted the HDM to the mobile station, the mobile station will receive the HDM from each of the other base stations that were indicated in the PSMM sent by the mobile station. Since each of these base stations will be included in the mobile station's active set, the mobile station will monitor the communications from each such base station and thus receive the HDM.

The details of the preferred and alternative embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples disclosed should be considered as exemplars, rather than as limitations on the present invention.

Figure 1:
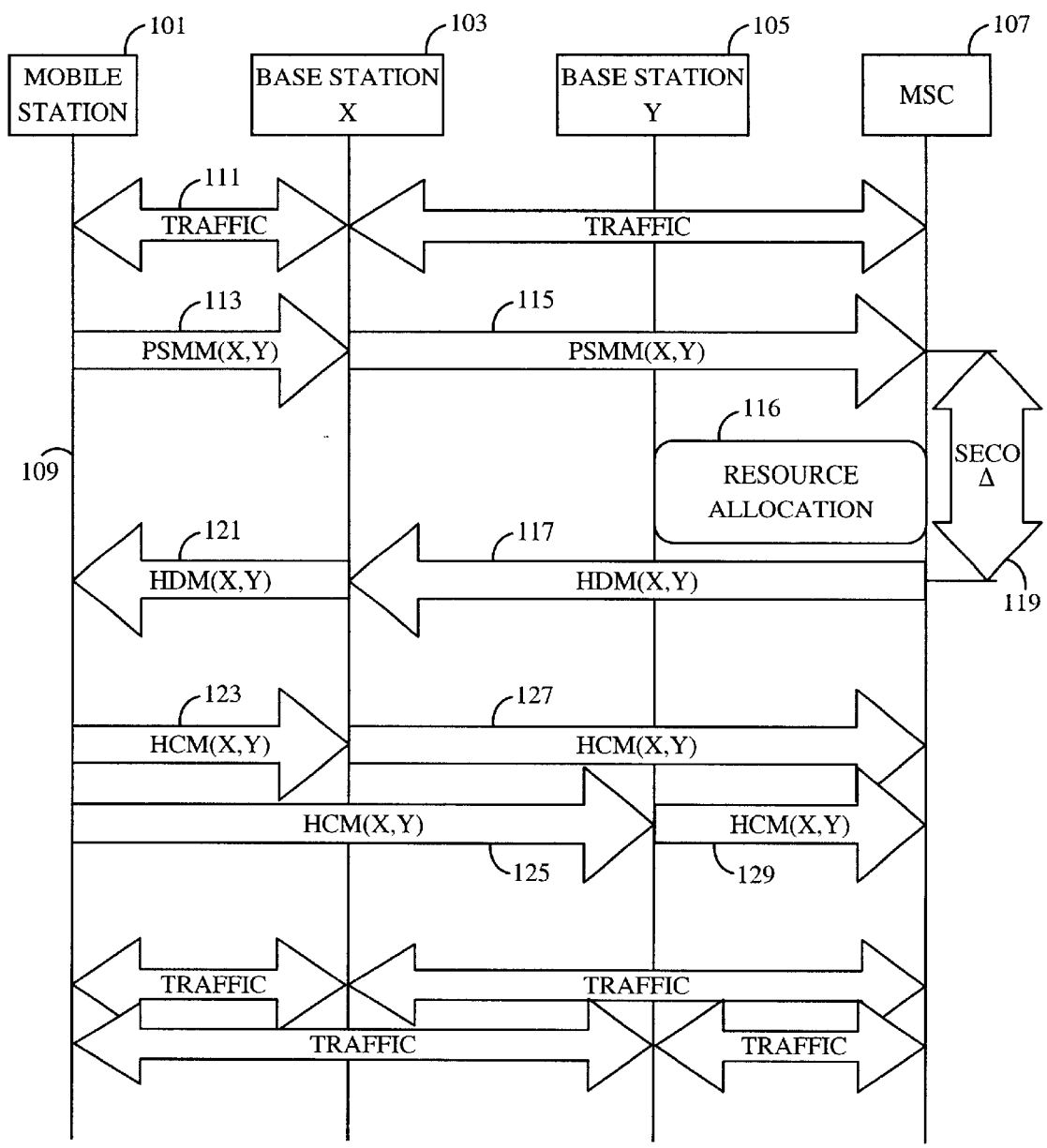
FIG. 1 is an illustration of one method for performing soft handoffs in accordance with the prior art.
Figure 2:
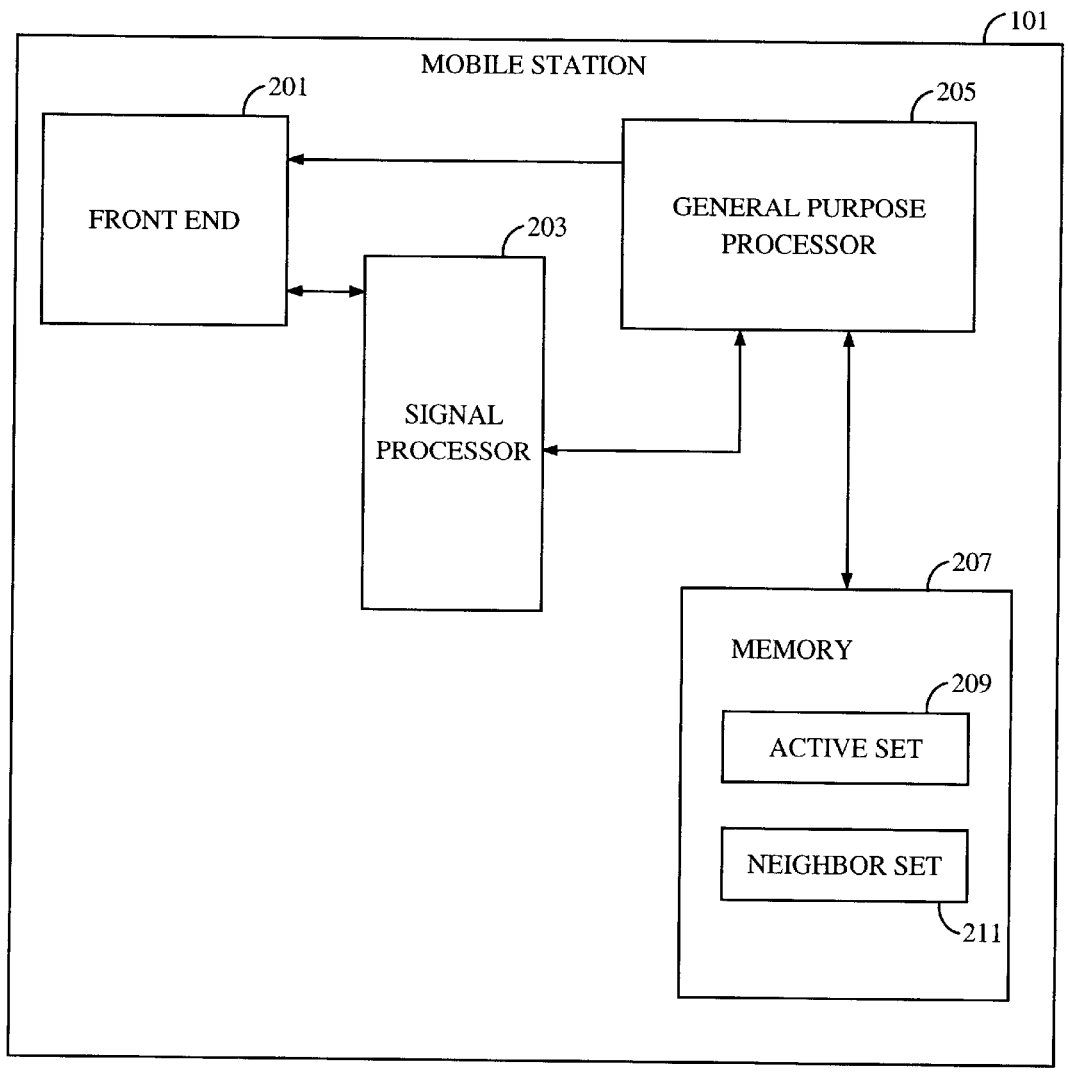
FIG. 2 is an illustration of a mobile station in accordance with one embodiment of the disclosed apparatus.

FIG. 2 is an illustration of a mobile station 200 in accordance with one embodiment of the disclosed apparatus. As shown in FIG. 2, the mobile station 200 has a front end 201, a signal processor 203, a general purpose processor 205, and a memory 207. The memory includes an area 209 in which an "Active Set" is stored, and an area 211 in which a "Neighbor Set" is stored. The function of each of the components of the mobile station 200 will be described below.

Figure 3:
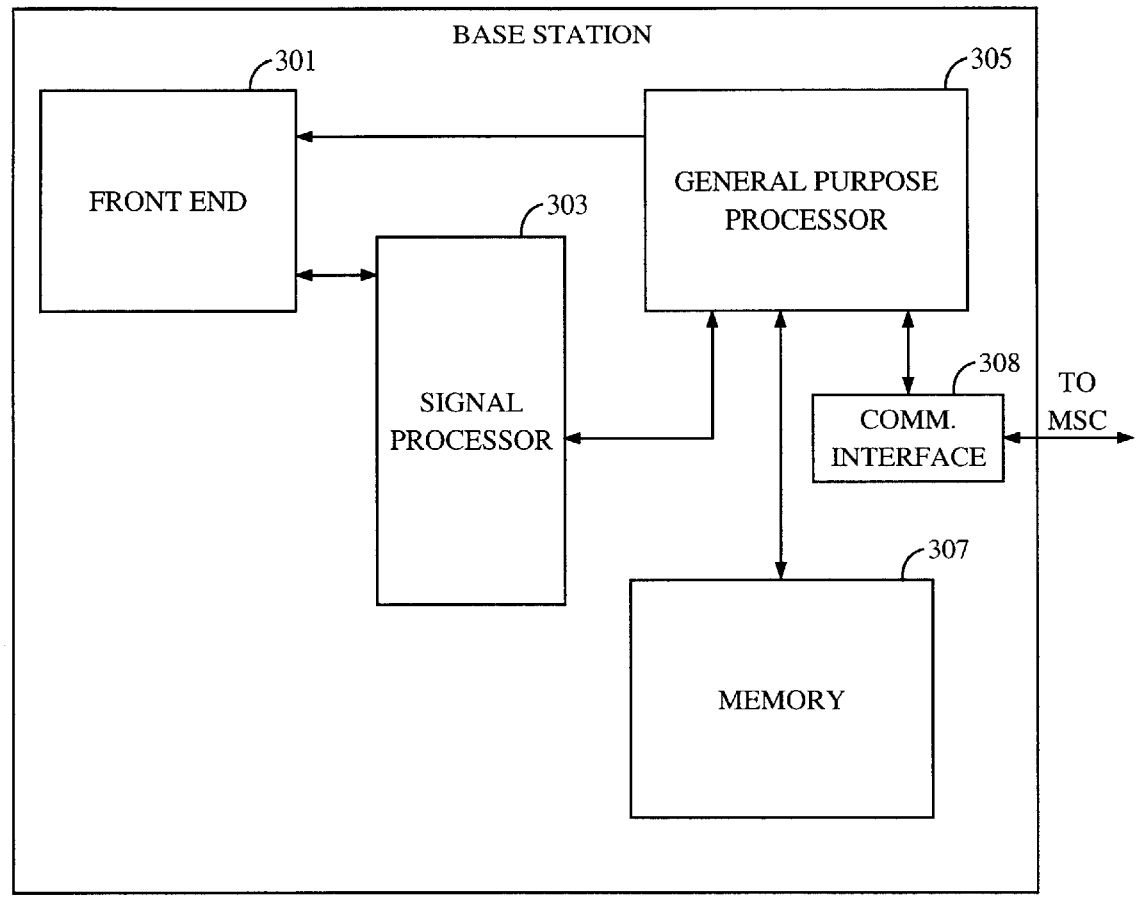
FIG. 3 is an illustration of a base station in accordance with one embodiment of the disclosed apparatus.

FIG. 3 is an illustration of a base station 300 in accordance with one embodiment of the disclosed apparatus. As shown in FIG. 3, the base station has a front end 301, a signal processor 303, a general purpose processor 305, a memory 307, and a communication interface 308. The function of each of the components of the base station 300 will be described below.

Figure 4:
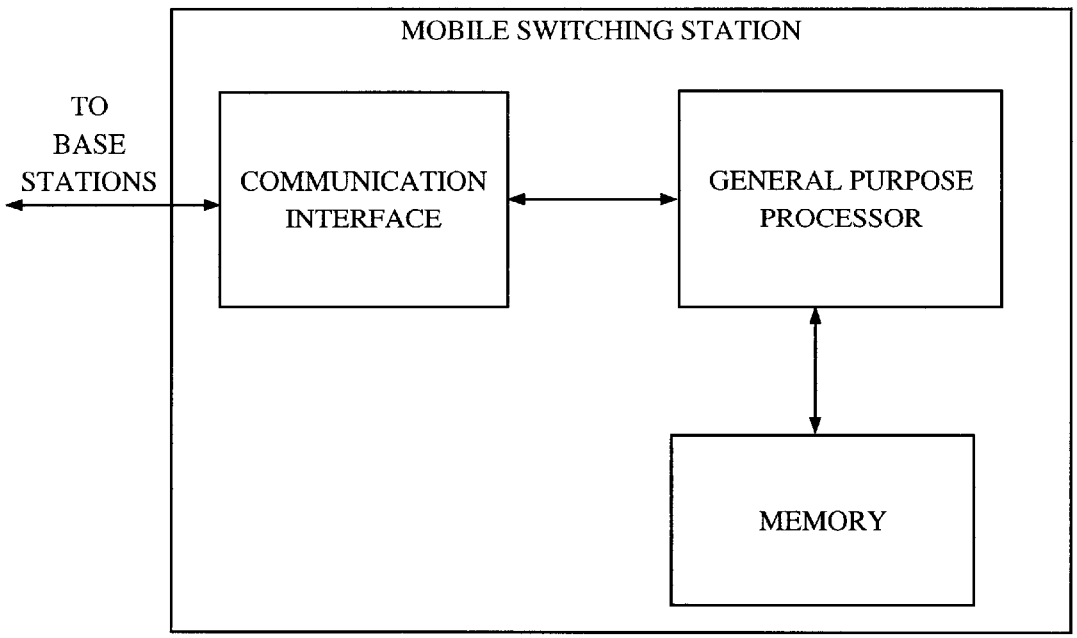
FIG. 4 is an illustration of a mobile switching center (MSC) in accordance with one embodiment of the disclosed apparatus.

FIG. 4 is an illustration of a mobile switching center (MSC) 400 in accordance with one embodiment of the disclosed apparatus. As shown in FIG. 3, the base station has a communication interface 401, a general purpose processor 403, and a memory 405. The function of each of the components of the MSC 400 will be described below.

Figure 5:
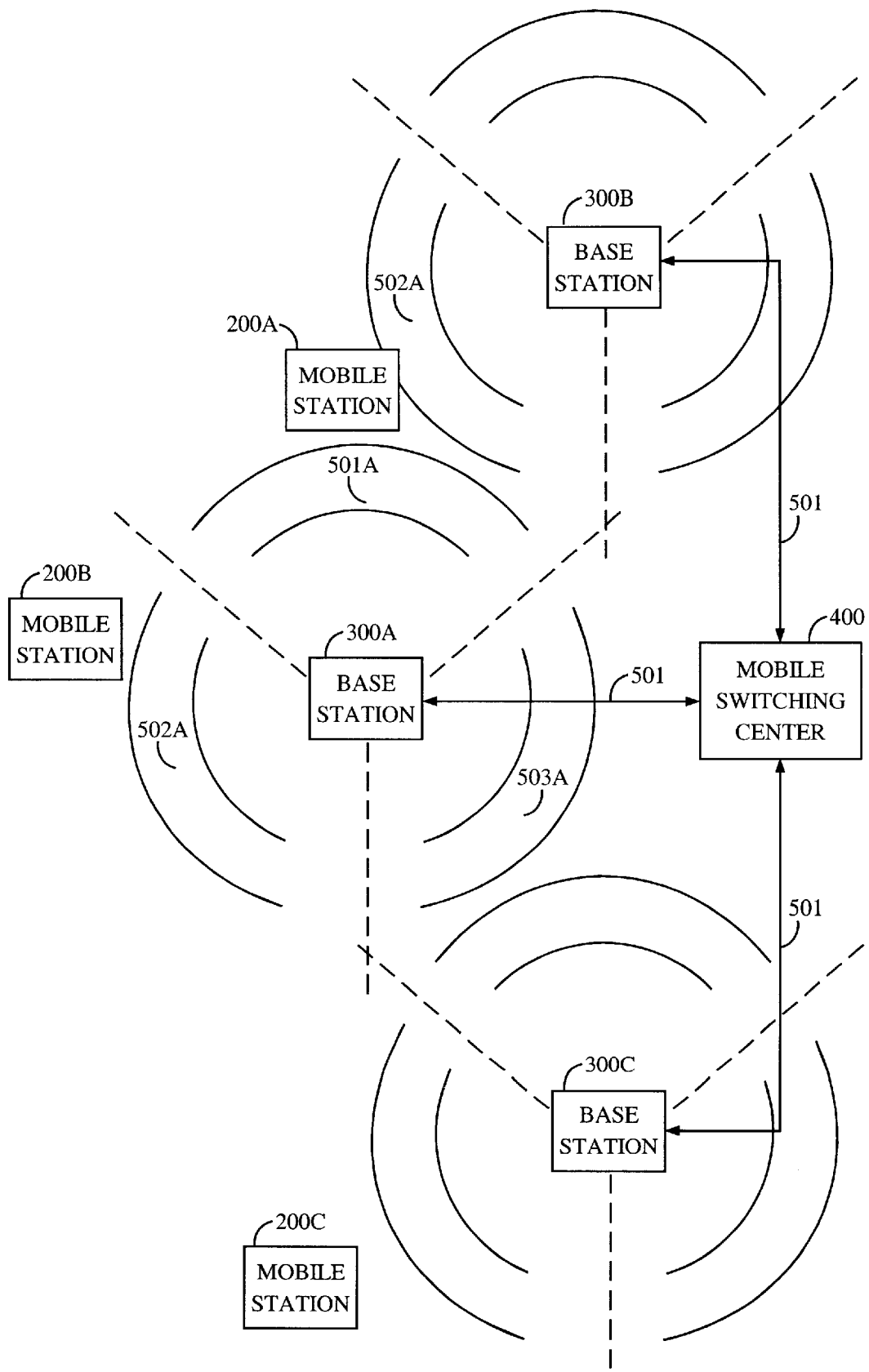
FIG. 5 is an illustration of a communication system that includes mobile stations, the base stations, and an MSC.

FIG. 5 is an illustration of a communication system that includes mobile stations 200, the base stations 300, and an MSC 400. It should be noted that the number of mobile stations, base stations, and MSCs that are shown in FIG. 5 is selected merely to make it convenient to describe the disclosed method and apparatus. However, in systems that incorporate the disclosed method and apparatus, there will typically be a greater number of each of these components. Nonetheless, the relationship between these components will be essentially as shown in FIG. 5.

As shown in FIG. 5, the mobile stations 200 (such as cellular telephones) each move about within a system of base stations 300. Each base station is in communication with an MSC 400. When a call to or from a mobile station 200 is established, the mobile station communicates with the base station 300. The base station relays the "traffic" to the MSC 400. For the purpose of this description, the traffic is that portion of the information that is sent from the mobile station 200 to the base station and which is intended for the device at the other end of the call. The MSC 400 in turn typically sends the traffic to the device at the other end of the call through a land based system, such as the public switched telephone network (PSTN) or over the internet. However, it should be noted that it in an alternative embodiment of the disclosed method and apparatus, the MSC 400 may transmit the traffic via an air link, such as a satellite uplink, line of sight microwave link, or other such radio connection. Therefore, it should be understood that there is no limitation to the manner in which the traffic is communicated from the MSC to another device which is at the other end of the call.

In one embodiment of the disclosed method and apparatus, the base stations 300 are arranged to transmit information into three sectors 501, 502, 503. In FIG. 5, one mobile station 200a is in a sector 501a of a first base station 300a, and is concurrently in a sector 502b of a second base station 300b. Therefore, the mobile station 200a will receive a pilot signal from both the base station 300a and the base station 300b. If the mobile station 200a was initially in the sector 501a of the base station 300a, but sufficiently far away from the base station 300*b* that the pilot signal being transmitted from base station 300*b* was not above a predetermined threshold, referred to hereafter as the "Active Pilot Threshold", then the following process would occur in accordance with the disclosed method and apparatus.

When the pilot transmitted by the base station 300*b* is first received by the mobile station 200*a* at a power level that is above the Active Pilot Threshold, then the mobile station 200*a* will generate a Pilot Strength Measurement Message (PSMM). Referring to FIG. 2, the pilots from both the base station 300*a* and the base station 300*b* will be received by the front end 201 in the mobile station 200*a*. The signals will preferably be digitized in the front end 201 and the digital representation of the signals coupled to the signal processor 203. The signal processor 203 will determine the signal strength of the pilot signals in conventional fashion. The values of the signal strength of each pilot will then be coupled the general purpose processor 205 to determine whether each pilot is above the Active Pilot Threshold. In addition, a determination will be made as to whether each pilot that is currently being received at a signal strength above the Active Pilot Threshold is currently in the Active Set 209 stored in memory 207. If a pilot is being received at a signal level that is above the Active Pilot Threshold, but is not in the Active Set, then a PSMM will be generated by the general purpose processor 205.

The PSMM will be transmitted to the MSC 400 over the connection 501 between the base stations and the MSC 400 (see FIG. 5). The PSMM will identify each of the pilots that are currently being received at a signal level that is greater the Active Pilot Threshold.

In addition, the general purpose processor 205 within the mobile station 200 will add each pilot that is being received by the mobile station 200 to the Active Set 209. In one embodiment of the disclosed method and apparatus, the general purpose processor 205 will determine how many pilots are currently in the Active Set. If the Active Set includes more than a desired number of pilots, then the general purpose processor 205 selects the desired number of pilots from among all of the pilots that were presented in the PSMM from the mobile station 200. The decision as to which pilots to include in the Active Set is preferably made by selecting those pilots that were received by the mobile station 200 at the strongest signal levels.

Once a pilot is included in the Active Set 209, the mobile station 200 will demodulate the traffic channel that is being transmitted from the base station associated with that pilot. The information that is required to demodulate the traffic channel for each of the pilots in the Neighbor Set is stored together with the Neighbor Set. A pilot that is to be included in the Active Set should be a neighbor to one of the active pilots (i.e., one of the pilots in the Active Set). Therefore, the information necessary to demodulate the traffic channel of any pilot that is received at a pilot signal strength that is greater than the Active Pilot Threshold should be available to the mobile station 200. In one embodiment of the disclosed method and apparatus, the information that is stored in the Neighbor Set 211 is provided by one or more of the base stations associated with the pilots in the Active Set.

Once the mobile station 200*a* transmits the PSMM to the base station 300*a*, the base station 300*a* relays the PSMM to the MSC 400. Referring to FIG. 3, the base station 300 receives the PSMM on either the reverse traffic channel or a control channel that is time multiplexed, code multiplexed, or otherwise distinguished from the traffic and pilot channels. The PSMM is received by the base station via the front end 301. The PSMM is digitized in the front end 301 and provided to the signal processor 303 for demodulation. The signal processor 303 demodulates the signal and provides the content of the signal to the general purpose processor 305 for transmission to the MSC 400 via the communication interface 308.

Referring to FIG. 4, the MSC 400 receives the content of the PSMM from the base station via the communication interface 401 within the MSC 400. The content of the PSMM is then coupled to the general purpose processor 403. The general purpose processor 403 within the MSC 400 generates an HDM. The HDM is a message that indicates which base stations 300 will be transmitting a forward traffic channel to the mobile station 200*a*. Since the MSC 400 preferably has the ability to select one or more base stations to transmit traffic, the HDM is essential to inform the mobile station 200*a* which of the base stations 300 identified by the pilots in the Active Set will truly be transmitting traffic.

The HDM is coupled back to the communication interface 401 within the MSC 400 for transmission to each of the base stations 300 indicated in the PSMM. The HDM is received within each of the base stations 300 by the communication interface 308. The HDM is then coupled to the general purpose processor 305 within each base station 300. Each general purpose processor 305 couples the HDM to the mobile station 200*a* that sent the PSMM. The mobile station 200*a* receives the HDM from at least the base station 300*b*, even if the signals transmitted on the forward traffic channel by base station 300*a* are no longer strong enough to be received by the mobile station 200*a*.

It should be understood that even though the disclosed method and apparatus is described as using a PSMM and HDM (terms that are well known in the industry), only the functions that are described herein are relevant to the disclosed method and apparatus. Therefore, if an industry standard PSMM or HDM has other functions, formats, or characteristics which are not referenced in this disclosure, then they are not to be considered as part of the disclosed method and apparatus. In effect, any message format may be used to indicate to the base stations 300 which pilots have been received at levels above the Active Pilot Threshold. Likewise, any message format may be used to indicate to the mobile station 200*a* which base stations will be transmitting traffic to that mobile station 200*a*.

Figure 6:
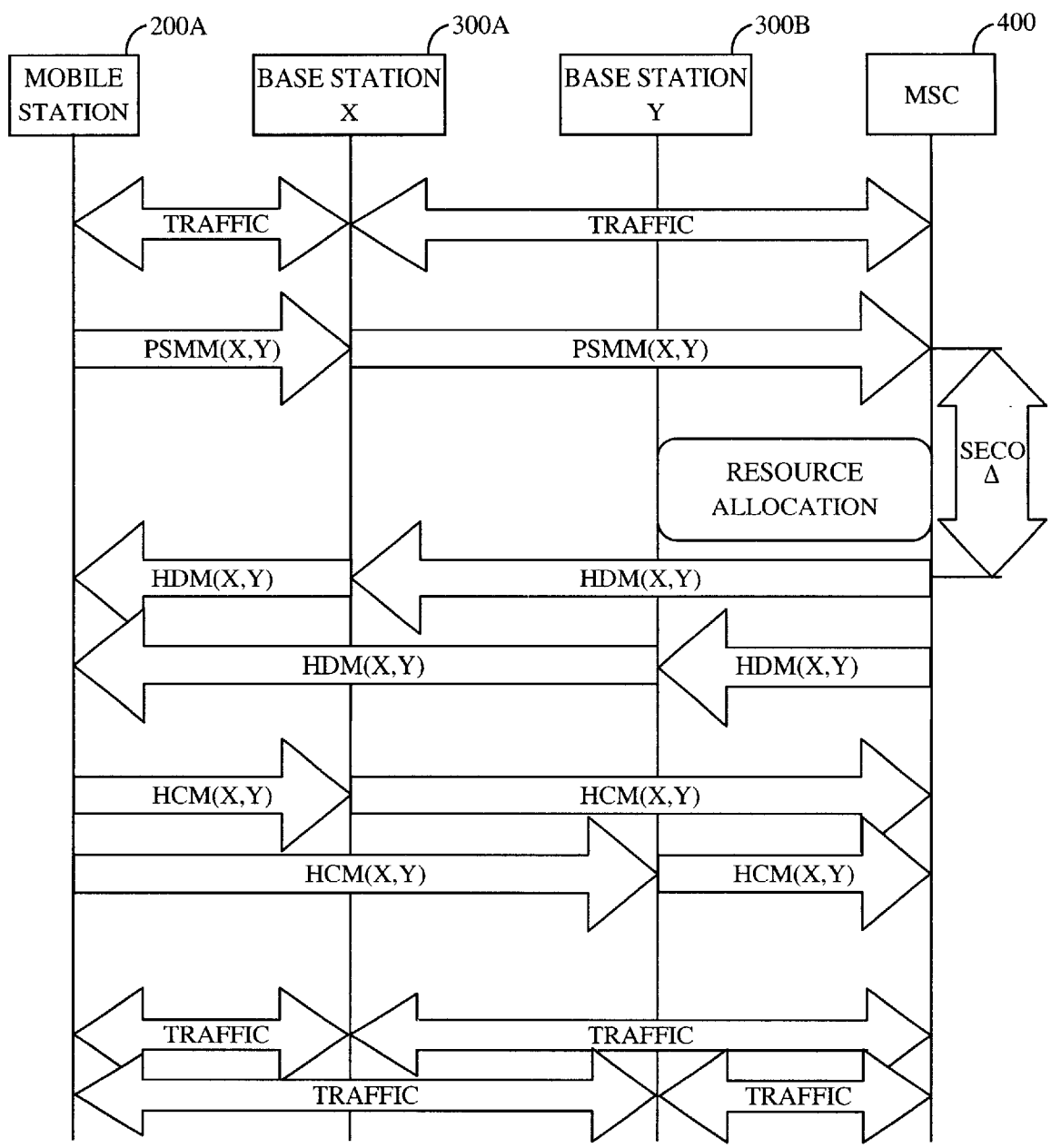
FIG. 6 is an illustration of the flow of messages between the mobile station, the base station, the base station, and the MSC in accordance with the disclosed method and apparatus.

FIG. 6 is an illustration of the flow of messages between the mobile station 200*a*, the base station 300*a*, the base station 300*b*, and the MSC 400 in accordance with the disclosed method and apparatus. As shown in FIG. 6, a traffic channel is initially established between the mobile station 200*a* and the base station 300*a*. When the mobile station 200*a* detects the pilot from base station 300*a* which is above the Active Pilot Threshold, the mobile station 200*a* transmits a PSMM to the base station 300*a*. The PSMM indicates that the mobile station 200*a* is currently receiving the pilots from both the base station 300*a* and the base station 300*b* at levels that are greater than the Active Pilot Threshold. This is indicated in FIG. 6 by the "X" and "Y" in parenthesis following the "PSMM". The PSMM is relayed by the base station 300*a* to the MSC 400. The MSC 400 communicates with the base station 300*b* to request resources be allocated by base station 300*b* to support a traffic channel to and from the mobile station 200*a*. The MSC 400 then generates and transmits to both the base stations 300*a*, 300*b* an HDM indicating that both the base stations 300*a*, 300*b* will be establishing traffic channels to the mobile station. The mobile station 200*a* then generates and transmits a handoff completion message HCM. The HCM is received by the base station 300a and relayed to the MSC 400. The HCM indicates to the MSC 400 that the mobile has successfully received the HDM.

Figure 7:
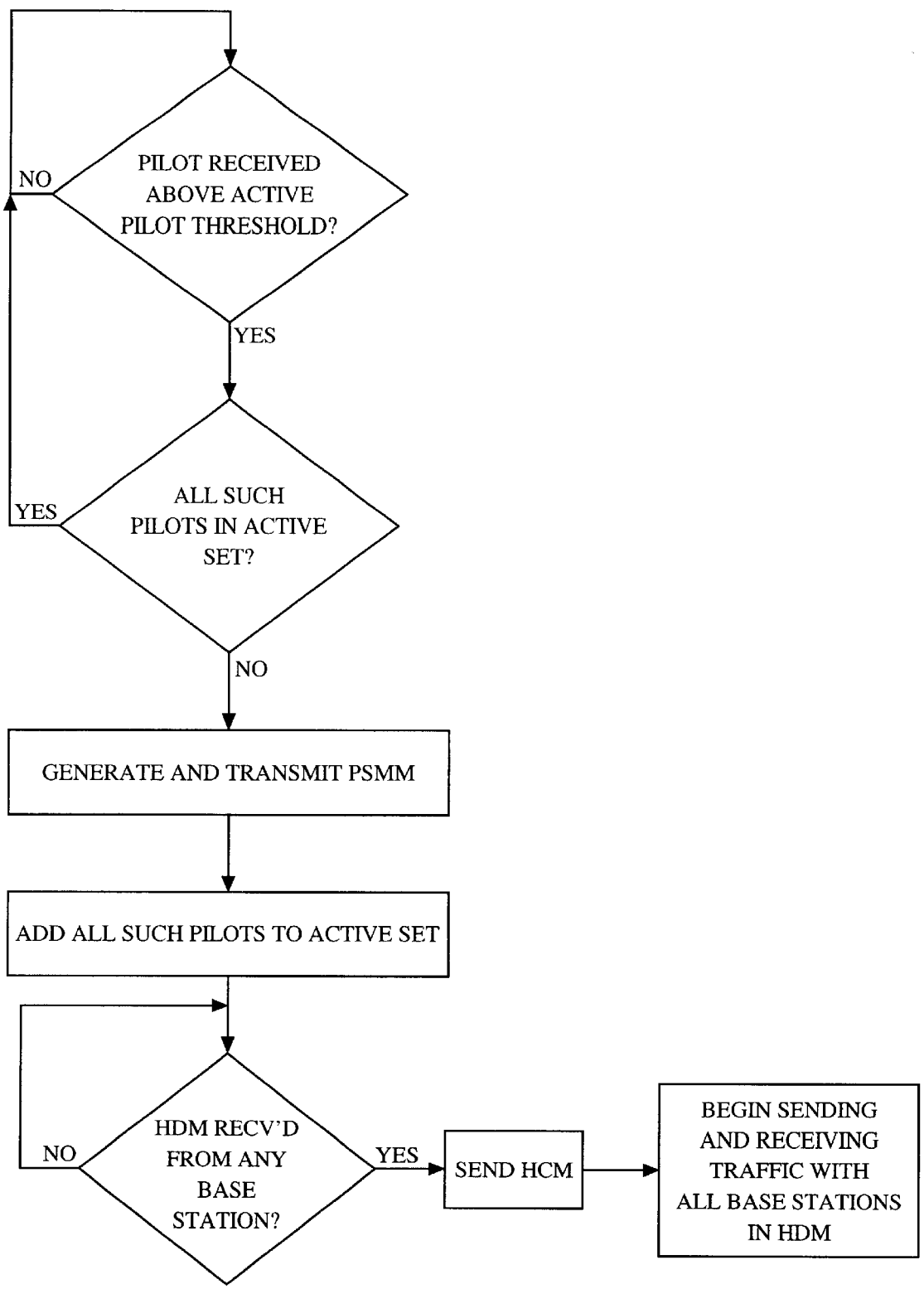
FIG. 7 is a flow chart that indicates the procedure performed by the mobile station in accordance with the disclosed method and apparatus.

FIG. 7 is a flow chart that indicates the procedure performed by the mobile station in accordance with the disclosed method and apparatus. In accordance with the method shown in FIG. 7, the mobile station 200a determines whether any pilots are being received at levels above the Active Pilot Threshold (STEP 701). If any pilots are being received at levels above the Active Pilot Threshold, then the mobile station 200a determines whether each such pilot is in the Active Set 209 (STEP 703). If at least one of these pilots is not in the Active Set 209, then a PSMM is generated and transmitted to the base stations with which the mobile station currently has an established traffic channel (i.e., those base stations 300 associated with pilots that are currently in the Active Set) (STEP 705).

Next, the mobile station 200a places each of the pilots that were received at levels above the Active Pilot Threshold in the Active Set 209 (STEP 707). After placing all of these pilots in the Active Set, the mobile station 200a then monitors the transmissions from each of the base stations associated with pilots in the Active Set in an attempt to receive an HDM (STEP 709). Once an HDM is received, the mobile station 200a generates and transmits an HCM indicating that the handoff has been completed (STEP 711). The mobile station 200a then begins to transmit and receive over the traffic channels to and from each of the base stations indicated in the HDM (STEP 713).

Figure 8:
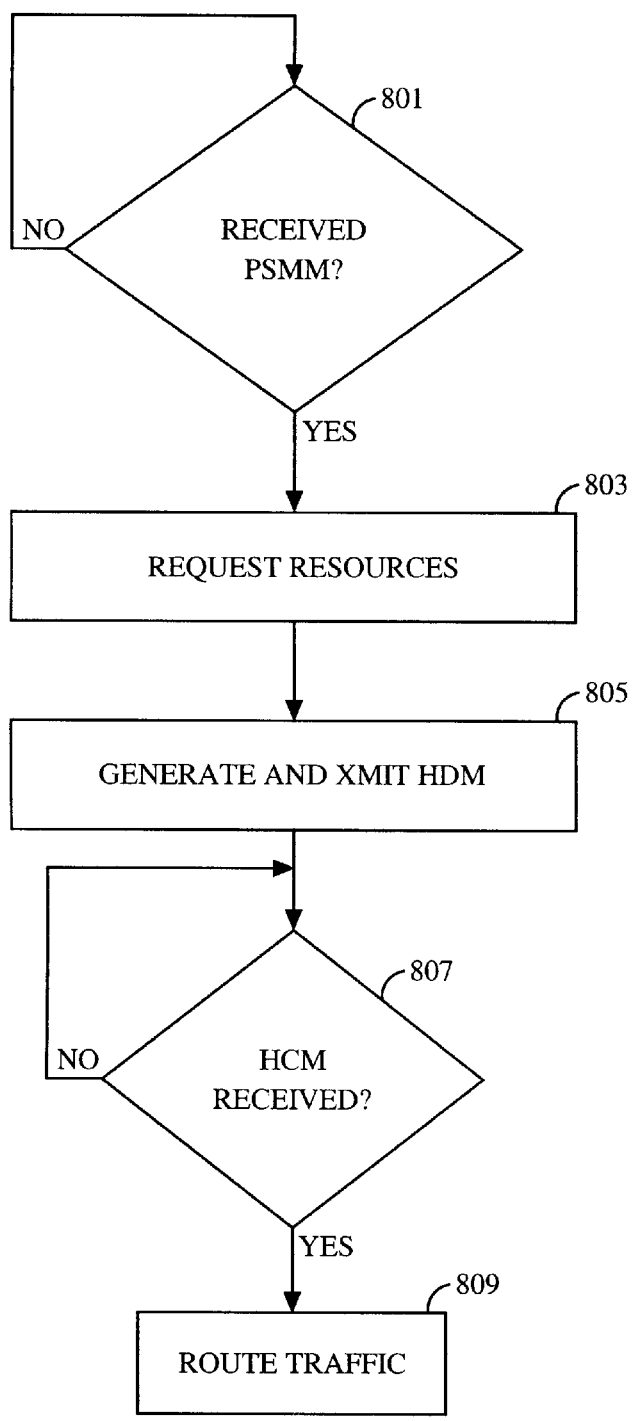
FIG. 8 is a flow chart that indicates the procedure performed by an MSC in accordance with the disclosed method and apparatus.

FIG. 8 is a flow chart that indicates the procedure performed by an MSC in accordance with the disclosed method and apparatus. In accordance with the method shown in FIG. 8, the MSC 400 awaits receipt of a PSMM from the mobile station 200a (STEP 801). Upon receipt of the PSMM, the MSC 400 requests that each of the base stations associated with a pilot identified in the PSMM allocate resources to the mobile station 200a (STEP 803). Alternatively, the MSC 400 only contacts those base station that do not already have a traffic channel to and from the base station 200a. In accordance with one method, upon receiving confirmation that the resources are allocated, the MSC 400 generates and transmits an HDM that indicates which base stations have resources currently allocated to the base station 200a (STEP 805). Alternatively, the HDM only identifies those base stations that have allocated resources in response to the PSMM, and not those that already had resources allocated previous to the receipt of the PSMM. The HDM is preferably transmitted to each of the base stations indicated by the PSMM. In an alternative method, the HDM is transmitted only to those base stations that are identified in the HDM (i.e., those base stations that have successfully allocated resources to the base station 200a). In one method, the HDM is only transmitted to base stations that were recently added to the Active Set.

The MSC 400 then waits for an HCM to be received (STEP 807). The HCM indicates that the handoff is complete. The HCM may be received from the mobile station 200a through all, or only through some, of the base stations that are currently in the Active Set 209.

Upon receipt of the HCM, the MSC 400 begins to route traffic through each of the base stations 300 that were identified in the HCM (STEP 809).

What is claimed is:

1. A method of soft handoff comprising:

measuring, at a mobile station, the power of signals transmitted by a plurality of base station transceivers;

determining each base station transceiver, not in communication with the mobile station via a traffic channel, that has a measured signal power greater than a threshold;

adding, by the mobile station to an active set, indicators of base station transceivers in accordance with the determining;

conveying indicators from the active set, via at least one base station transceiver communicating with the mobile station via a traffic channel; and establishing a traffic channel between the mobile station and at least one of the conveyed base station transceivers not in communication with the mobile station via a traffic channel.

2. The method of claim 1 further comprising instructing at least one of the base station transceivers that established a traffic channel to send data to the mobile station.

3. The method of claim 1 further comprising:

sending a resource allocation instruction;

wherein sending the resource allocation instruction includes advising at least one of the base station transceivers that established a traffic channel by a system controller to prepare for communication with the mobile station.

4. The method of claim 1 further comprising sending a direction message.

5. The method of claim 4 wherein the sending a direction message comprises:

sending a direction message via the base station transceivers that are identified by the conveyed indicators.

6. The method of claim 4 wherein the sending a direction message comprises:

sending a direction message via at least one base station transceiver that is identified by a system controller in accordance with the conveyed indicators.

7. The method of claim 4 wherein the sending a direction message comprises:

sending a direction message via at least one base station transceiver not in communication with the mobile station via a traffic channel.

8. The method of claim 1 further comprising receiving a direction message.

9. The method of claim 8 further comprising:

adjusting the active set indicators in accordance with the direction message.

10. The method of claim 9 wherein the adjusting comprises:

removing from the active set any indicator not matching at least one indicator in the direction message.

11. The method of claim 8 further comprising:

using the indicators in the active set to search for the direction message.

12. The method of claim 8 wherein the receiving a direction message comprises:

receiving a direction message via at least one base station transceiver not in communication with the mobile station via a traffic channel.

13. The method of claim 1 wherein the adding indicators comprises:

adding an indicator for each of the determined base station transceivers that is a neighboring transceiver.

14. The method of claim 1 wherein the adding indicators comprises:

adding an indicator for each of the determined base station transceivers.

15. The method of claim 1 further comprising:
adding to an active set at the mobile station an identification of at least one neighboring transceiver, wherein the identification of the at least one neighboring transceiver is provided by a system controller;
searching for the direction message using the identifications of the active set; and
receiving the direction message from the at least one neighboring transceiver.

16. The method of claim 1 further comprising:
adding to an active set at the mobile station an identification of at least one neighboring transceiver, wherein the identification of the at least one neighboring transceiver is provided by a system controller;
searching for the direction message using the identifications of the active set; and
receiving the direction message from the first transceiver.

17. The method of claim 1, wherein a first set of the plurality of base station transceivers provides coverage to a cell in a cellular system.

18. The method of claim 1, wherein a second set of the plurality of base station transceiver provides coverage to a sector of a cell in a cellular system.

19. The method of claim 1 wherein the conveying indicators comprises conveying the indicators contained in the active set.

20. The method of claim 1 wherein the conveying indicators comprises conveying the indicators added to the active set.

* * * * *